(12) United States Patent
Lecuyer et al.

(10) Patent No.: US 10,109,860 B2
(45) Date of Patent: Oct. 23, 2018

(54) LITHIUM-SULPHUR BATTERY

(71) Applicants: CENTRE NATIONAL DE LA RECHERCHE SCIENTIFIQUE, Paris (FR); BLUE SOLUTIONS, Ergue Gaberic (FR); UNIVERSITE DE NANTES, Nantes (FR)

(72) Inventors: Margaud Lecuyer, Combrit (FR); Marc Deschamps, Quimper (FR); Joël Gaubicher, Nantes (FR); Bernard Lestriez, Nantes (FR); Dominique Guyomard, Sautron (FR); Philippe Poizot, Grandchamp-Desfontaines (FR)

(73) Assignees: CENTRE NATIONAL DE LA RECHERCHE SCIENTIFIQUE, Paris (FR); BLUE SOLUTIONS, Ergue Gaberic (FR); UNIVERSITE DE NANTES, Nantes (FR)

( * ) Notice: Subject to any disclaimer, the term of this patent is extended or adjusted under 35 U.S.C. 154(b) by 77 days.

(21) Appl. No.: 15/322,714

(22) PCT Filed: Jul. 16, 2015

(86) PCT No.: PCT/FR2015/051942
§ 371 (c)(1),
(2) Date: Dec. 30, 2016

(87) PCT Pub. No.: WO2016/009147
PCT Pub. Date: Jan. 21, 2016

(65) Prior Publication Data
US 2017/0141397 A1    May 18, 2017

(30) Foreign Application Priority Data
Jul. 17, 2014 (FR) ..................................... 14 56873

(51) Int. Cl.
*H01M 4/58* (2010.01)
*H01M 4/62* (2006.01)
(Continued)

(52) U.S. Cl.
CPC ....... *H01M 4/5815* (2013.01); *H01M 2/1653* (2013.01); *H01M 4/382* (2013.01);
(Continued)

(58) Field of Classification Search
CPC .. H01M 2/1653; H01M 4/382; H01M 4/5815; H01M 4/622; H01M 4/625;
(Continued)

(56) References Cited

U.S. PATENT DOCUMENTS 6,030,720 A     2/2000 Chu et al.
2004/0009399 A1  1/2004 Kim et al.

FOREIGN PATENT DOCUMENTS

WO   2013004945   1/2013
WO   2013155038   10/2013

OTHER PUBLICATIONS

Search Report dated Mar. 6 2015.
Binary electrolyte based on tetra . . . dated Nov. 14, 2002.
A Novel Polypropylene Microporous Film dated Sep. 1, 1996.

*Primary Examiner* — Brittany Raymond
(74) *Attorney, Agent, or Firm* — Ipsilon USA, LLP

(57) ABSTRACT

The present invention relates to the field of lithium-sulphur batteries having high energy and power densities. In particular the present invention relates to a lithium-sulphur battery comprising a porous separator made of biaxially oriented polypropylene and to its process of manufacture.

17 Claims, 5 Drawing Sheets

(51) Int. Cl.
*H01M 2/16* (2006.01)
*H01M 10/0525* (2010.01)
*H01M 10/0565* (2010.01)
*H01M 10/0569* (2010.01)
*H01M 4/38* (2006.01)
*H01M 10/052* (2010.01)

(52) U.S. Cl.
CPC ........... *H01M 4/622* (2013.01); *H01M 4/625* (2013.01); *H01M 10/052* (2013.01); *H01M 10/0525* (2013.01); *H01M 10/0565* (2013.01); *H01M 10/0569* (2013.01); *H01M 2300/0025* (2013.01); *H01M 2300/0028* (2013.01); *H01M 2300/0085* (2013.01); *Y02T 10/7011* (2013.01)

(58) Field of Classification Search
CPC ......... H01M 10/0525; H01M 10/0569; H01M 10/0565; H01M 2300/0025; H01M 2300/0028; H01M 2300/0085; Y02T 10/7011
See application file for complete search history.

LITHIUM-SULPHUR BATTERY

RELATED APPLICATIONS

This application is a National Phase Application of PCT/FR2015/051942 filed on Jul. 16, 2015, which in turn claims the benefit of priority from FR 14 56873 filed on Jul. 17, 2014, the entirety of which are incorporated herein by reference.

BACKGROUND

Field of the Invention

The present invention relates to the field of lithium-sulphur batteries having high energy and power densities. In particular the present invention relates to a lithium-sulphur battery comprising a porous separator made of biaxially oriented polypropylene and to its process of manufacture.

Description of Related Art

Lithium batteries have become essential constituents in numerous devices which can comprise portable appliances, such as in particular mobile telephones, computers and lightweight equipment, or heavier appliances, such as two-wheel transportation means (bicycles, mopeds) or four-wheel transportation means (electric or hybrid motor vehicles). They are also widely studied for use in the field of stationary energy storage.

A lithium metal battery comprises at least one negative electrode and at least one positive electrode, between which is placed a solid electrolyte or a separator impregnated with a liquid electrolyte. The negative electrode consists of a sheet of lithium metal or of lithium alloy, optionally supported by a current collector, and the positive electrode consists of a current collector supporting an electrode material containing at least one positive electrode active material capable of reversibly inserting lithium ions, optionally a polymer which acts as binder (e.g. poly(vinylidene fluoride) or PVdF) and/or optionally an agent which confers electron conductivity (e.g. carbon). The liquid electrolyte for example consists of a lithium salt in solution in a solvent chosen in order to optimize the transportation and the dissociation of the ions. The separator has, for its part, to ensure perfect isolation between the two electrodes in order to prevent any risk of short circuit. It is thus made of porous material which does not conduct electrons, generally made of polymer (e.g. polyethylene) material or made of fibres (e.g. glass fibres or wood fibres), and has to have:

- an appropriate mechanical strength, in order to withstand the stresses due to the variations in volume of the active materials during the charging and discharging cycles,
- a sufficient chemical resistance, in order to ensure that it holds over time since it is immersed in a highly corrosive solution (i.e. electrolyte), and
- an appropriate porous structure, in order to make possible the diffusion of the anions and cations of the electrolyte and to prevent any transportation of active material from one electrode to the other.

During the operation of the battery, lithium ions pass from one to the other of the electrodes through the electrolyte. During discharging of the battery, an amount of lithium reacts with the positive electrode active material from the electrolyte and an equivalent amount is introduced into the electrolyte from the active material of the negative electrode, the concentration of lithium thus remaining constant in the electrolyte. The insertion of the lithium into the positive electrode is compensated for by supplying electrons from the negative electrode via an external circuit. During charging, the reverse phenomena take place.

The various constituents of a lithium battery are chosen so as to produce, at the lowest possible cost, batteries which have a high energy density, which have a good cycling stability and which operate with safety.

One of the most promising systems for the electrochemical storage of energy is the lithium-sulphur battery, on the one hand because elemental sulphur $S_8$ is an abundant, economical and nontoxic element and, on the other hand, because this material exhibits a high theoretical specific capacity and a high theoretical energy density by weight, respectively of 1675 mAh/$g_{sulphur}$ and 2600 Wh/$kg_{sulphur}$ if the elemental sulphur $S_8$ is completely reduced to lithium sulphide $Li_2S$ at a voltage of close to 2 volts (with respect to the $Li^+/Li^0$ pair). By comparison, the energy densities by weight currently obtained for the best Li-ion batteries are 200-250 Wh/kg, 100-150 Wh/kg for a Na-ion battery and 50 Wh/kg for a redox-flow battery. It is thus possible to hope to achieve energy densities of the order of 500 Wh/kg for a lithium-sulphur (i.e. Li/S) battery, which is comparable to the values obtained for Li-air batteries.

A lithium-sulphur battery generally comprises a metal negative electrode (i.e. anode) composed of lithium or of a lithium-based alloy, a positive electrode (i.e. cathode) comprising sulphur or a sulphur-comprising organic compound as active material, and a separator generally composed of a porous membrane of polyolefins (e.g. polyethylene, polypropylene) which is impregnated by a liquid electrolyte comprising at least one lithium salt, or a polymer electrolyte ensuring, by itself, both the physical separation of the electrodes and the transportation of the lithium ions.

However, in a lithium-sulphur battery, several problems are generally encountered. First of all, at the negative pole, the electrode of lithium metal is subject to the appearance of dendrites at its surface during recharging. This is because, as lithium has a tendency to grow in the columnar form, it is deposited nonuniformly at the surface of the lithium metal electrode and thus forms dendrites. During the cycling, the dendrites grow and can perforate the separator placed between the two electrodes and cause a short circuit. At the end of a local short circuit brought about by a dendrite, the latter generally acts as fuse and self-destructs, which has few consequences with regard to the performance levels of the battery. On the other hand, the repetition of these micro-short circuits contributes to a self-discharge of the battery. In extreme cases, as it is possible for the current circulating through these short circuits to be very high, this results in local heating and, if unfavourable conditions are combined, in a possible thermal runaway of the battery (e.g., decrease in thermal stability of the battery due to the ageing, battery brought to a high temperature related to the application). In recent years, research has preferably been directed at the development of solid electrolytes (e.g., gelled polymer electrolytes) intended to replace liquid electrolytes. This is because the use of liquid electrolytes results virtually systematically in the appearance of short circuits in cycling or when the current densities applied are high. Furthermore, the conventional separators used in the presence of a liquid electrolyte are not stable with regard to lithium metal and have a tendency to react with the latter to form a foam, thus resulting in its deterioration. Furthermore, at the positive pole, the reduction of the sulphur by the lithium results in the formation of negatively charged liquid polysulphides which are soluble in the majority of ordinary liquid electrolytes, which liquid polysulphides diffuse through the separator as far as the negative electrode, where they are reduced. This reduction of the polysulphides at the negative pole results in the formation of a layer of $Li_2S$ or of $Li_2S_2$ on the lithium metal. As this layer is firm and electrically insulating, it results in the passivation of the negative electrode and the blocking of the electrochemical reactions. As the intermediate lithium polysulphides $Li_2S_n$ (2<n<8) can react with the negative electrode, they also promote the self-discharge. In addition, they are responsible for the installation of a shuttle mechanism which takes place in charging and which results in the deterioration of the performance levels of the battery, in particular in terms of coulombic efficiency.

Thus, Barchasz et al. have described, in International Patent Application WO2013/004945, a lithium-sulphur battery comprising:
- at least one negative electrode comprising a sheet of lithium and a current collector made of copper;
- at least one positive electrode comprising an ink formed from 75% by weight of elemental sulphur $S_8$ as active material, from 10% by weight of carbon black and from 5% by weight of carbon fibres, as agents generating an electron conductivity, and from 10% by weight of poly(vinylidene fluoride) (PVdF) binder, and a current collector made of aluminium;
- an electrode separator comprising at least one nonwoven of fibres (e.g., glass, polyethylene terephthalate (PET), polyolefin, poly(vinyl alcohol) (PVA) or polyamide (PA) fibres, and the like) exhibiting a porosity of at least 50% and a thickness of between 50 and 200 µm; and
- an electrolyte in excess comprising at least one lithium salt which impregnates said separator.

According to Barchasz et al., the use of a separator comprising at least one nonwoven formed of fibres and an excess of electrolyte makes it possible to prevent the precipitation of the sulphur-comprising entities, and also the passivation of the electrodes, while obtaining a high energy density by weight of the order of 200 Wh·kg$^{-1}$. However, the lithium-sulphur battery obtained is not optimized to prevent the formation of dendrites and the diffusion of the active material through the electrolyte (via the separator) in order to obtain a stable discharge capacity over several cycles. Furthermore, the thickness of the separators tested (i.e., greater than 50 µm) does not make it possible to guarantee a sufficient energy density by volume.

In parallel, Patent Application EP 0 492 942 A2 describes the manufacture of a porous biaxially oriented film based on polypropylene and polyethylene and its use in a large number of applications, such as filters, separators of electrochemical cells, reverse osmosis membranes, water-proofing membranes, coatings for motor vehicle accessories, surgical drapes and protective clothing for use in hospitals and in electronic clean rooms, and the like. However, said porous biaxially oriented film made of polymer is not optimized to be used specifically in a lithium-sulphur battery. This is because the separators depend on the performance levels desired for a given application. Thus, the porous film as described does not make it possible to guarantee sufficient electrochemical stability and sufficient mechanical strength (e.g., size of the pores of greater than 5 µm), a discharge capacity which is stable over several cycles, while preventing the premature death of the battery related to the formation of dendrites. This is because, as the size of the pores can reach values of the order of approximately 20 µm, such a separator leads to the prediction of a complete unsuitability for opposing the formation of dendrites, unless it exhibits a very high thickness, then resulting in a significant lowering in the energy density by volume of the battery envisaged.

Objects and Summary

The aim of the present invention is to overcome the disadvantages of the abovementioned prior art and to develop an economical lithium-sulphur battery with improved electrochemical performance levels, in particular in terms of stability to cycling and of energy density by volume.

This aim is achieved by the invention which will be described below.

A first subject-matter of the invention is thus a lithium-sulphur battery comprising:
- a negative electrode comprising lithium metal or an alloy of lithium metal,
- a positive electrode comprising at least one sulphur-comprising agent chosen from elemental sulphur $S_8$ and an organic sulphur-comprising compound having at least one S—S bond, at least one polymer binder $P_1$ and at least one agent generating an electron conductivity,
- an electrolyte comprising at least one liquid linear or cyclic polyether of low molar mass and at least one lithium salt $L_1$, and
- a porous separator, said lithium-sulphur battery being characterized in that the porous separator is a biaxially oriented separator comprising at least polypropylene and said positive electrode comprises at least 40% by weight approximately of sulphur (S) with respect to the total weight of said positive electrode.

The battery of the invention exhibits noteworthy electrochemical performance levels in terms of energy density by volume and of stability of the specific capacity during the discharge over a large number of cycles, which makes it possible to believe that the diffusion of the polysulphides is limited.

In the present invention, "a liquid linear or cyclic polyether of low molar mass" means a liquid linear or cyclic polyether with a molar mass of less than or equal to 20,000 g·mol$^{-1}$ approximately, preferably of less than or equal to 2000 g·mol$^{-1}$ approximately and more preferably of less than or equal to 600 g·mol$^{-1}$ approximately.

In the present invention, "a liquid linear or cyclic polyether of low molar mass" is also known as "polyether".

The biaxially oriented separator used in the lithium-sulphur battery of the invention makes it possible not only to ensure the electrical separation of the electrodes but also to prevent the formation of dendrites while guaranteeing good electrochemical performance levels, in particular in terms of stability in cycling. In addition, the separator is stable with regard to the electrolyte of the battery, whether said electrolyte is in a liquid form or in a solid form (e.g., gel polymer electrolyte). Finally, by virtue of the combination of a biaxially oriented separator and of an electrolyte comprising at least one polyether, the transportation of the lithium ions is optimized while avoiding the diffusion of the polysulphides from the positive electrode toward the negative electrode.

In a specific embodiment of the invention, the separator exhibits a thickness ranging from 5 µm to 50 µm approximately, preferably from 10 µm to 40 µm approximately and more preferably from 10 µm to 30 µm approximately.

This is because the separator must not be too thin, in order to exhibit good mechanical strength and electrochemical behaviour during the cycling, to avoid short circuits and to accommodate a sufficient amount of electrolyte. However, it must not be too thick, otherwise the battery will be penalized in terms of energy densities by weight and by volume (mass effect) and in terms of performance levels at high rate or at low temperature (polarization effect).

According to a preferred embodiment of the invention, the separator exhibits a porosity of greater than or equal to 50% by volume approximately, preferably of greater than or equal to 55% by volume approximately and more preferably of greater than or equal to 60% by volume approximately.

In a specific embodiment, the separator exhibits pores of medium size ranging from 50 nm to 3 µm approximately, preferably from 50 nm to 1 µm approximately and more preferably from 100 nm to 500 nm approximately.

By virtue of this porosity, said separator can be easily impregnated by the electrolyte while guaranteeing a sufficient mechanical strength.

This is because the separator of the invention exhibits a puncture strength of at least 30 newtons approximately and preferably of at least 40 newtons approximately.

In addition, the separator of the invention exhibits an elongation at break of at least 5 mm approximately and preferably of at least 10 mm approximately. This elongation is measured during puncture tests using a metal punch, at ambient temperature.

The separator can exhibit a porosity of Gurley type ranging from 50 to 500 s/100 cm$^3$ approximately and preferably ranging from 50 to 400 s/100 cm$^3$ approximately. The porosity of the Gurley type $P_{Gurley}$ indicates the time taken (in seconds) for 100 cm$^3$ of the air to pass through 1 square inch of separator. The porosity of Gurley type $P_{Gurley}$ reflects the permeability of a separator: the lower the $P_{Gurley}$ value, the more the exchanges through the separator are favoured and thus the more the diffusion of the entities is facilitated.

The separator can exhibit a heat shrinkage in the longitudinal direction (i.e., longitudinal shrinkage) and/or a heat shrinkage in the transverse direction (i.e., transverse shrinkage) of strictly less than 15% approximately and preferably strictly of less than 10% approximately, whatever its thickness (the shrinkage is measured at 100° C. for 1 hour).

This is because the biaxially oriented porous separator has to have a heat shrinkage which is sufficiently low to be able to withstand temperature rises in the lithium-sulphur battery and thus to prevent the battery from being damaged by uncontrolled heating. Its use in the process for the manufacture of the cells is furthermore facilitated.

In the present invention, the expression "biaxially oriented" means that the separator has been obtained by drawing in a longitudinal direction (machine direction) and in a direction transverse to the longitudinal direction.

The separator can additionally comprise a polymer chosen from polyethylene, a copolymer of polyethylene and one of their mixtures.

The polypropylene can be a homopolymer of polypropylene (PP) or a copolymer of polypropylene.

When the separator comprises other polymers than polypropylene, it comprises at least 90% by weight of polypropylene and preferably at least 95% by weight of polypropylene, with respect to the total weight of the separator.

The separator of the invention can consist solely of polypropylene.

The separator preferably does not contain any inorganic filler and/or any ceramic.

The separator preferably does not comprise polymer(s) which can react with the polysulphides, such as PVdF or polymers comprising at least one C=C double bond, such as natural synthetic rubbers.

The separator can be monolayer or multilayer. When it is multilayer, it is preferably bilayer, so as to exhibit the lowest possible thickness without, however, harming its mechanical properties.

The separator should have good wettability properties with regard to the electrolyte used so that its impregnation is easy, in particular by performing a simple contacting operation when the electrolyte is liquid or by colaminating when the electrolyte is solid or gelled.

The polyether of the electrolyte of the battery of the invention can be chosen from:
  polyethylene glycols of formula H—[O—CH$_2$—CH$_2$]$_m$—OH in which m is between 1 and 13,
  glycol ethers of formula R—[O—CH$_2$—CH$_2$]$_p$—O—R' in which p is between 1 and 13 and R and R', which are identical or different, are linear, branched or cyclic alkyl groups which can comprise from 1 to 20 carbon atoms,
  ethers of formula R$^1$—[CH$_2$—O]$_q$—R$^{1''}$ in which q is between 1 and 13 and R$^1$ and R$^{1'}$, which are identical or different, are linear, branched or cyclic alkyls which can comprise from 1 to 20 carbon atoms and optionally heteroatoms,
  cyclic ethers which can comprise from 2 to 20 carbon atoms or cyclic polyethers which can comprise from 3 to 40 carbon atoms, and
  one of their mixtures.

The polyether(s) used in the electrolyte of the invention is (are) particularly stable with regard to lithium and sulphur-comprising compounds, thus making it possible to limit as much as possible the side reactions.

The polyether of the invention is preferably linear.

In an even more preferred embodiment, the polyether is tetraethylene glycol dimethyl ether (TEGDME) of formula CH$_3$O—(CH$_2$—CH$_2$)$_4$—OCH$_3$ (i.e., R, R'=CH$_3$ and p=4).

The lithium salt $L_1$ can be chosen from lithium fluorate (LiFO$_3$), lithium bis(trifluoromethanesulphonyl)imide (LiTFSI), lithium hexafluorophosphate (LiPF$_6$), lithium fluoroborate (LiBF$_4$), lithium metaborate (LiBO$_2$), lithium perchlorate (LiClO$_4$), lithium nitrate (LiNO$_3$), lithium bis (fluorosulphonyl)imide (LiFSI) and their mixtures.

LiTFSI is the preferred lithium salt $L_1$.

It is obvious that the electrolyte of the battery of the invention is nonaqueous, that is to say that it thus does not comprise water or aqueous solvents. This is because an aqueous electrolyte is not compatible with a negative electrode made of lithium metal.

The electrolyte preferably does not comprise organic solvents of carbonate type, it being possible for the latter to react with the polysulphides formed during the cycling.

According to a first alternative form, the electrolyte is a liquid electrolyte. It then completely soaks the separator in order to impregnate the porosity thereof.

According to this first alternative form, the concentration of the lithium salt $L_1$ in the liquid electrolyte ranges from 0.8 to 8 mol/l approximately and preferably from 1 to 5 mol/l approximately.

The liquid electrolyte can consist solely of a lithium salt $L_1$ and of a polyether.

The liquid electrolyte is preferably a solution comprising 1.5 mol/l of LiTFSI in TEGDME.

According to a second alternative form, the electrolyte is a gelled polymer electrolyte; it is then deposited on the separator in order to impregnate the porosity thereof and to form a self-supported dry electrolyte film.

According to this second alternative form, the electrolyte additionally comprises at least one polymer binder $P_2$.

The polymer binder $P_2$ can be chosen from polyolefins, such as homopolymers or copolymers of ethylene and propylene, or a mixture of at least two of these polymers; homopolymers and copolymers of ethylene oxide (e.g. PEO, copolymer of PEO), of methylene oxide, of propylene oxide, of epichlorohydrin or of allyl glycidyl ether, or their mixtures; halogenated polymers, such as homopolymers and copolymers of vinyl chloride, of vinylidene fluoride (PVdF), of vinylidene chloride, of ethylene tetrafluoride or of chlorotrifluoroethylene, copolymers of vinylidene fluoride and of hexafluoropropylene (PVdF-co-HFP) or their mixtures; non-electron-conducting polymers of anionic type, such as poly(styrenesulphonate), poly(acrylic acid), poly(glutamate), alginate, pectin or their mixtures; polyacrylates; and one of their mixtures.

The gelled polymer electrolyte can comprise from 20 to 70% by weight approximately of polymer binder $P_2$ and preferably from 40 to 60% by weight approximately of polymer binder $P_2$, with respect to the total weight of the gelled polymer electrolyte.

The preferred polymer binders $P_2$ are the copolymer of ethylene oxide and of propylene oxide and the copolymer of ethylene oxide and of butylene oxide.

The gelled polymer electrolyte can comprise from 15 to 45% by weight approximately of lithium salt $L_1$ and preferably from 20 to 35% by weight approximately of lithium salt $L_1$, with respect to the total weight of the gelled polymer electrolyte.

The gelled polymer electrolyte can comprise from 5 to 40% by weight approximately of polyether and preferably from 10 to 30% by weight approximately of polyether, with respect to the total weight of the gelled polymer electrolyte.

The battery in accordance with the invention can operate between 0 and 110° C. approximately and preferably between 20 and 100° C. approximately.

In a specific embodiment of the invention, the positive electrode of the battery of the invention comprises at least 45% by weight approximately of sulphur (S) and preferably at least 50% by weight approximately of sulphur (S), with respect to the total weight of said positive electrode.

The sulphur-comprising organic compound can be chosen from organic polysulphides, in particular those of general formula $R^2$—S—$S_n$—$R^3$ in which $R^2$ and $R^3$, which are identical or different, represent a linear, branched or cyclic alkyl chain which can comprise from 1 to 20 carbon atoms, n being between 1 and 50, and disulphide polymers exhibiting a sequence of S—S bonds which can be broken during the discharging cycle of a lithium-sulphur battery and reformed during the charging cycle.

The sulphur-comprising agent is preferably elemental sulphur $S_8$. This is because the latter confers, on the lithium-sulphur battery, a greater energy density due to its high storage capacity by weight.

The agent generating an electron conductivity can represent from 5 to 30% by weight approximately, preferably from 5 to 20% by weight approximately, with respect to the total weight of the positive electrode.

The agent generating an electron conductivity suitable for the present invention is preferably chosen from carbon black, SP carbon, acetylene black, carbon fibres and nanofibres, carbon nanotubes, graphene, graphite, metal particles and fibres and one of their mixtures.

The agent generating an electron conductivity is preferably carbon black.

According to a preferred form of the invention, the agent generating an electron conductivity is an essentially mesoporous carbon-comprising agent exhibiting the following characteristics:

an $S_{BET}$ specific surface of greater than or equal to 800 m$^2$/g approximately, preferably of greater than or equal to 1000 m$^2$/g approximately and more preferably still of greater than or equal to 1400 m$^2$/g approximately, said specific surface being calculated by the BET method (i.e., method of Brunauer, Emmett and Teller, 1938), a mean size of the mesopores of between 4 and 10 nm approximately, said size being calculated by the BJH method (i.e., method of Barrett, Joyner and Halenda, 1951), and a total pore volume of greater than or equal to 1.5 cm$^3$/g approximately, preferably of greater than or equal to 2 cm$^3$/g approximately and more preferably still of greater than or equal to 2.5 cm$^3$/g approximately, said total pore volume being calculated by the BET method.

In the present invention, the expression "carbon-comprising agent" means an agent essentially comprising carbon, that is to say comprising at least 80% by weight approximately of carbon, preferably at least 90% by weight approximately of carbon and more preferably at least 95% by weight approximately of carbon.

In the present invention, the expression "essentially mesoporous carbon-comprising agent" means that the carbon-comprising agent comprises a mesopore volume representing at least 70% by volume approximately of the total pore volume, preferably at least 80% by volume approximately of the total pore volume and more preferably at least 90% by volume approximately of the total pore volume, said mesopore volume being calculated from the BJH method.

In the description which will follow and unless explicitly mentioned otherwise, all the specific surface values shown were calculated by the BET method. In the same way, all the mesopore size values shown were calculated by the BJH method. Finally, all the total pore volume values shown were determined by the BET method and all the mesopore volume values were calculated by the BJH method.

Preferably, the carbon-comprising agent particles are in the form of spherical particles (i.e., in the form of beads) in order to promote the conduction, in particular in the direction perpendicular to the positive electrode (i.e. in the direction of its thickness), and thus to facilitate the electrochemical exchanges between the positive electrode and the negative electrode. This is because the carbon-comprising agent particles in the form of spherical particles have a propensity to form three-dimensional conducting networks. When the carbon-comprising agent particles are in the form of spherical particles, this means that several carbon atoms form spheres.

Thus, in order to promote conduction in the transverse direction of the positive electrode (i.e., in the direction of its thickness), the carbon-comprising agent is preferably not in the form of fibres or of platelets, such as carbon fibres or graphene platelets, since the latter will preferably become oriented in the direction of manufacture of the film.

In a particularly preferred embodiment of the invention, the carbon-comprising agent comprises spherical carbon particles having a mean diameter ranging from 20 nm to 100 nm approximately. Thus, each sphere comprising several carbon atoms exhibits a mean diameter ranging from 20 nm to 100 nm approximately.

Said carbon-comprising agent is preferably carbon black.

Mention may be made, as example of essentially mesoporous carbon black exhibiting the characteristics as defined in the present invention, of the carbon blacks sold under the references: Ketjenblack 600JD®, Ketjenblack 700JD® and Timcal Ensaco 350G®.

According to a specific embodiment, the positive electrode comprises from 5 to 20% by weight approximately of polymer binder $P_1$ and preferably from 5 to 15% by weight approximately of polymer binder $P_1$, with respect to the total weight of the positive electrode.

The polymer binder $P_1$ can be chosen from copolymers of ethylene and of propylene, or a mixture of at least two of these polymers; homopolymers and copolymers of ethylene oxide (e.g. PEO, copolymer of PEO), of methylene oxide, of propylene oxide, of epichlorohydrin or of allyl glycidyl ether, or their mixtures; halogenated polymers, such as homopolymers and copolymers of vinyl chloride, of vinylidene fluoride (PVdF), of vinylidene chloride, of ethylene tetrafluoride or of chlorotrifluoroethylene, copolymers of vinylidene fluoride and of hexafluoropropylene (PVdF-co-HFP) or their mixtures; polyacrylates, such as polymethyl methacrylate; polyalcohols, such as polyvinyl alcohol (PVA); electron-conducting polymers, such as polyaniline, polypyrrole, polyfluorenes, polypyrenes, polyazulenes, polynaphthalenes, polyacetylenes, poly(p-phenylene vinylene), polycarbazoles, polyindoles, polyazepines, polythiophenes, poly(p-phenylene sulphide) or their mixtures; polymers of cationic type, such as polyethyleneimine (PEI), polyaniline in the emeraldine salt (ES) form, poly(quaternized N-vinylimidazole), poly(acrylamide-co-diallyldimethylammonium chloride) (AMAC) or their mixtures; and one of their mixtures.

A polymer of cationic type (i.e., positively charged) makes it possible to improve the retention of the polysulphides, which are negatively charged, in the positive electrode and thus limit the diffusion of the polysulphides into the electrolyte during the cycling.

The polymer binder $P_1$ is preferably PVA, PEI, AMAC or one of their mixtures.

The positive electrode can additionally comprise at least one liquid linear or cyclic polyether of low molar mass as defined in the present invention.

The positive electrode can comprise from 2 to 30% by weight approximately of polyether and preferably from 5 to 25% by weight approximately of polyether, with respect to the total weight of the positive electrode.

The positive electrode can additionally comprise at least one lithium salt $L_2$.

The positive electrode can comprise from 2 to 25% by weight approximately of lithium salt $L_2$, preferably from 3 to 15% by weight approximately of lithium salt $L_2$ and more preferably from 3 to 8% by weight approximately of lithium salt $L_2$, with respect to the total weight of the positive electrode.

The lithium salt $L_2$ can be chosen from lithium fluorate ($LiFO_3$), lithium bis(trifluoromethanesulphonyl)imide (LiTFSI), lithium hexafluorophosphate ($LiPF_6$), lithium fluoroborate ($LiBF_4$), lithium metaborate ($LiBO_2$), lithium perchlorate ($LiClO_4$), lithium nitrate ($LiNO_3$), lithium bis(fluorosulphonyl)imide (LiFSI) and their mixtures.

LiTFSI is the preferred lithium salt $L_2$.

The positive electrode of the invention can exhibit a porosity of less than or equal to 40% by volume approximately and preferably of less than or equal to 30% by volume approximately, with respect to the total volume of the electrode. This thus makes it possible to improve the energy density of the battery.

It should be noted that the total weight of the positive electrode comprises the weight of the sulphur-comprising agent, the weight of the polymer binder $P_1$, the weight of the carbon-comprising agent generating an electron conductivity, optionally the weight of the polyether, if it is present, and optionally the weight of the lithium salt $L_2$, if it is present.

The positive electrode can be prepared:

a) by mixing at least one sulphur-comprising agent with at least one agent conferring an electron conductivity, at least one polymer binder $P_1$, optionally at least one lithium salt $L_2$, optionally at least one liquid linear or cyclic polyether of low molar mass and optionally at least one solvent of said polymer binder $P_1$, in order to prepare an electrode paste, b) by applying said electrode paste to at least one support, c) by drying said electrode paste in order to obtain a positive electrode in the form of a supported film.

The polymer binder $P_1$, the lithium salt $L_2$ and the liquid linear or cyclic polyether of low molar mass are as defined above.

Stage a) can be carried out by extrusion or by grinding.

Extrusion is highly advantageous since it makes it possible to easily obtain electrodes of low porosity while not using much solvent. It also makes it possible to avoid a stage of calendering on the dry electrode, which can cause structural modifications of the electrode, harm the good coating of the grains of the carbon-comprising agent and thus can cause collapse of the electrode during the cycling. Finally, the calendering stage exhibits the disadvantage of increasing the number of stages in order to obtain the electrode and thus its production cost.

The solvent of the polymer binder $P_1$ of stage a) makes it possible to dissolve said polymer binder $P_1$.

When it is present, said solvent preferably represents less than 30% by weight approximately of the total weight of the mixture of sulphur-comprising agent, of agent generating electron conductivity, of polymer binder $P_1$, optionally of lithium salt $L_1$ and optionally of polyether.

The use during the manufacture of the positive electrode of a small amount of solvent of the polymer binder $P_1$ makes it possible to result in a positive electrode of low porosity (i.e., ≤40% by volume approximately). This low porosity makes it possible to control and to optimize the amount of sulphur present in the positive electrode and thus to arrive at optimum energy densities by volume.

The solvent of stage a) can be chosen from water, N-methyl-pyrrolidone, solvents of carbonate type, such as ethylene carbonate, propylene carbonate, dimethyl carbonate, diethyl carbonate or ethyl methyl carbonate, acetone, alcohols, such as methanol, ethanol or propanol, and their mixtures.

The solvent is preferably chosen from water, acetone, alcohols and their mixtures.

Stage b) can be carried out by laminating or by coating.

The support can be a current collector and/or a support film.

Mention may be made, as example of current collector, of a current collector made of aluminium covered with a carbon-based layer (corrosion-resistant layer).

Mention may be made, as example of support film, of a plastic film of silicone-treated polyethylene terephthalate (PET) type.

The positive electrode supported film obtained at the conclusion of stage c) can have a thickness ranging from 2 to 100 μm approximately and preferably from 10 to 60 μm.

Stage c) can be carried out at a temperature sufficient to make it possible to remove the solvent of stage a).

The sulphur and the sulphur-comprising organic compounds exhibit the disadvantage of being electrically and ionically insulating (e.g., electron conductivity of sulphur $S_8=5\times10^{-30}$ S·cm$^{-1}$ at 25° C.). Consequently, in order to make possible a reversible electrochemical reaction at high current rates, the sulphur thus has preferably to be in intimate contact with an electrically conducting additive, such as carbon.

Thus, when the agent conferring an electron conductivity is an essentially mesoporous carbon-comprising agent as defined in the present invention, said essentially mesoporous carbon-comprising agent can be subjected, in the presence of the sulphur-comprising agent, to a pretreatment in order to form a composite material comprising sulphur (S) and carbon (C) in order to promote said intimate contact.

Said pretreatment can comprise the following stages:

i) a stage of mixing an essentially mesoporous carbon-comprising agent as defined in the present invention and a sulphur-comprising agent as defined in the present invention, the amount of sulphur (S) in said mixture ranging from 75% to 85% by weight approximately, ii) a stage of grinding the mixture obtained in the preceding stage i), iii) a stage of heat treatment of the ground mixture obtained in the preceding stage ii) in a closed container, at a temperature sufficient to cause the sulphur to melt, and iv) a stage of grinding the heat-treated mixture of the preceding stage iii) in order to obtain a composite material comprising sulphur (S) and carbon (C).

According to a preferred embodiment, the amount of sulphur (S) in the mixture of stage i) ranges from 80% to 85% by weight approximately.

The grinding stage ii) makes it possible to facilitate the homogeneous distribution of the sulphur over the carbon. It can be carried out manually, in particular using a mortar, or mechanically, in particular using a bead mill.

The sufficient temperature of stage iii) is advantageously chosen so that the sulphur is in the liquid state and that the viscosity of the molten sulphur is low.

The sufficient temperature of the heat treatment of stage iii) can range from 115° C. to 270° C. approximately, preferably from 130° C. to 220° C. approximately and more preferably from 140° C. to 170° C. approximately.

The duration of the heat treatment of stage iii) can range from 30 minutes to 24 hours approximately and preferably from 1 to 5 hours approximately.

Stage iii) is preferably carried out under a dry air atmosphere in particular exhibiting a dew point of less than or equal to −30° C. approximately.

The inventors of the present patent application have thus discovered that, when the carbon-comprising agent exhibits a specific size of mesopores ranging from 4 to 10 nm, the sulphur is capable, during stage iii), of filling the porosity of the carbon-comprising agent. This is because the size of the pores of the carbon-comprising agent has to be sufficiently high (that is to say, greater than 4 nm) to allow the molten sulphur to penetrate inside the pores but sufficiently low (that is to say, less than 10 nm) in order to exert a sufficient retention of the polysulphides during the cycling.

Furthermore, the high specific surface ($S_{BET} \geq 700$ m$^2$/g) of the carbon-comprising agent makes it possible to obtain a thin layer of sulphur over the whole of the skeleton formed by the carbon-comprising agent and to prevent the formation of agglomerates of sulphur in the composite material of the invention and for this reason the rapid diffusion of the sulphur during the cycling. The high pore volume is also necessary in order to effectively retain the polysulphides formed during the cycling.

Finally, the composite material as obtained at the conclusion of stage iv) exhibits a thin sulphur coating which is homogenously distributed, thus making it possible to increase its accessibility during the electrochemical reactions and to enhance its mechanical stability.

Stage iv) can be carried out manually, in particular using a mortar, or mechanically, in particular using a bead mill.

Thus, on conclusion of stage iv), the composite material comprising sulphur and carbon is structured so that the sulphur forms a surface coating of the carbon-comprising agent by entering into the mesopores of the latter.

The pretreatment can additionally comprise, between stage iii) and stage iv), a stage of cooling the closed container comprising the ground mixture.

According to a preferred embodiment, the pretreatment does not comprise (an)other heat treatment stage(s) than stage iii).

The pretreatment which makes it possible to result in the composite material is simple and rapid and does not require a complex device. By virtue of this pretreatment, the coating of the carbon-comprising agent by the sulphur is facilitated with a low production cost.

When the mixture of sulphur-comprising agent and of essentially mesoporous carbon-comprising agent is subjected to the pretreatment as defined in the present invention, stage a) of preparation of the positive electrode consists in mixing said composite material comprising sulphur (S) and carbon (C) and as defined above with at least one polymer binder $P_1$, optionally at least one lithium salt $L_1$, optionally at least one liquid linear or cyclic polyether of low molar mass and optionally at least one solvent of said polymer binder $P_1$, in order to obtain an electrode paste.

In a specific embodiment, the positive electrode of the invention does not comprise an agent conferring an electron conductivity other than the essentially mesoporous carbon black as defined in the present invention.

This is because the presence of the essentially mesoporous carbon black may be sufficient to confer, on the positive electrode, an electron conductivity sufficient to allow good operation of the battery.

A second subject-matter of the invention is a process for the manufacture of a lithium-sulphur battery as defined in the first subject-matter of the invention, characterized in that it comprises the following stages:

A) a stage of preparation of a liquid electrolyte or of a gelled polymer electrolyte as defined in the present invention, in particular by mixing at least one liquid linear or cyclic polyether of low molar mass with at least one lithium salt $L_1$, B) a stage of assembling a positive electrode, a negative electrode and a separator as are defined in the present invention, said process initially comprising one or other of the following stages:

C-1) a stage of impregnation of the assembly as obtained in stage B) by the liquid electrolyte prepared in stage A), or C-2) a stage of impregnation of the separator by the gelled polymer electrolyte prepared in stage A), said impregnation being prior to the assembling stage B).

The liquid linear or cyclic polyether of low molar mass, the lithium salt $L_1$ and the polymer binder $P_2$ are as defined in the first subject-matter of the invention.

The liquid electrolyte of stage A) is preferably prepared by dissolving, with stirring, at least one lithium salt $L_1$ in a liquid linear or cyclic polyether of low molar mass, optionally at a temperature ranging from 20 to 120° C. approximately.

The gelled polymer electrolyte of stage A) can be obtained by extrusion of at least one polymer binder $P_2$ with a solution comprising at least one liquid linear or cyclic polyether of low molar mass and at least one lithium salt $L_1$, in order to obtain an electrolyte paste, and then by laminating the electrolyte paste, in particular between two support films, in order to obtain a gelled polymer electrolyte film.

The extrusion can be carried out at a temperature ranging from 60 to 170° C. approximately.

The concentration of the lithium salt $L_1$ in said solution can range from 2 to 25 mol/l approximately.

The two support films can be plastic films of silicone-treated PET.

The impregnation of the separator by the gelled polymer electrolyte (cf. stage C-2)) can be carried out by colaminating the separator and the gelled polymer electrolyte film, in particular at a temperature of 80° C. approximately, and preferably at a pressure of 5 bar approximately.

Stages A) and C-2) can be one and the same stage during which the electrolyte paste obtained by extrusion is laminated directly on the separator in order to obtain a separator impregnated with a gelled polymer electrolyte.

The present invention is illustrated by the examples below, to which, however, it is not limited.

DETAILED DESCRIPTION

Examples

The starting materials used in the examples are listed below:
Ketjenblack 600JD® carbon black, AkzoNobel,
$S_8$ sulphur, with a purity of 99.5%, Sigma Aldrich,
PEO copolymer, ZSN 8100, Zeospan,
copolymer of vinylidene fluoride and of hexafluoropropylene (PVdF-co-HFP), Solex, Solvay,
LiTFSI, 3M,
silicone-treated PET film, Mitsubishi,
TEGDME with a purity of 98%, Alfa Aesar,
polyvinyl alcohol (PVA) with a molar mass of 72 000 g/mol, BioChemica,
monolayer separator made of polypropylene S-A, Celgard 2500,
biaxially oriented monolayer separator made of polypropylene S-1, BPF220, Bolloré,
biaxially oriented bilayer separator made of polypropylene S-2, Treopore PBS M63-NV509/09, Treofan,
biaxially oriented monolayer separator made of polypropylene S-3, Treopore PDA M10-NV549/08, Treofan,
biaxially oriented monolayer separator made of polypropylene S-4, Treopore PDA M4-NV549/09, Treofan.

Unless otherwise indicated, all the materials were used as received from the manufacturers.

Example 1

Preparation of a Composite Material Comprising Sulphur (S) and Carbon (C)

A carbon/sulphur mixture was prepared by mixing a Ketjenblack carbon black with sulphur $S_8$ in the following C/S proportions by weight: 18.8/81.2.

The C/mixture thus obtained was subsequently ground in a mortar and then stored in a closed container.

Said container containing the ground mixture of carbon and sulphur was subjected to a heat treatment at a temperature of 155° C. under dry air for 1 h 30.

The heat-treated mixture was subsequently ground in a mortar in order to obtain the composite material 1.

The characteristics [specific surface (in $m^2/g$), total pore volume (in $cm^3/g$), pore volume (in $cm^3/g$), main diameter of the pores (in nm)] of the carbon black used to prepare the composite material 1 are presented in Table 1 below:

TABLE 1

|  | Specific surface ($m^2/g$) | Total volume ($cm^3/g$) | BJH volume ($cm^3/g$) 2-50 nm | Mean diameter pores (BET) (nm) | Mean diameter pores (BJH) (nm) |
|---|---|---|---|---|---|
| Ketjenblack Carbon Black | 1529 (BET) | 3.24 (<126 nm)$^a$ | 2.84 | 8.48 | 7.74 |

$^a$Maximum mean diameter of the pores taken into account in order to calculate the total volume.
The specific surface, the total pore volume, the BJH pore volume and the mean diameter of the pores of the Ketjenblack carbon black were evaluated using a device sold under the trade name ASAP2010 by Micromeritics.

Figure 1:
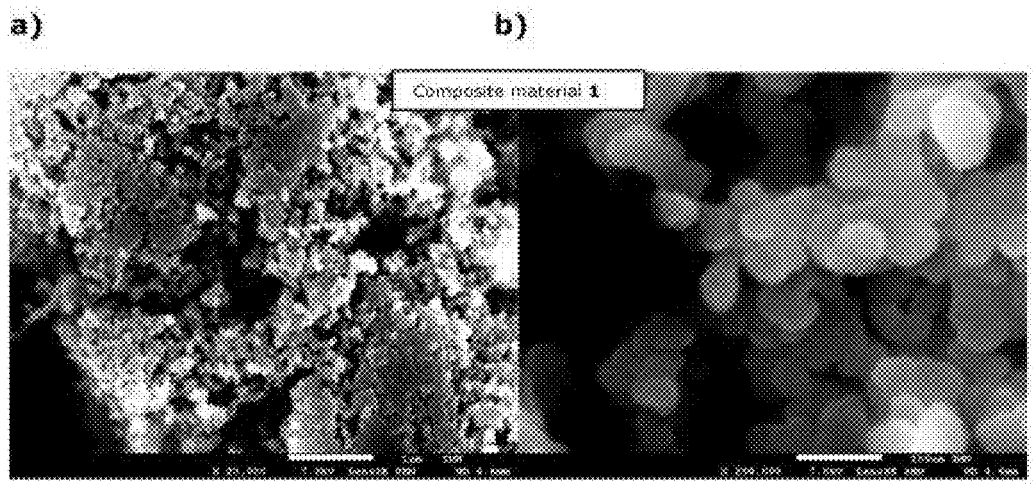
FIGS. 1a and 1b shows the composite material by scanning electron microscopy (SEM) from example 1 in accordance with one embodiment

FIG. 1 shows the composite material 1 by scanning electron microscopy (SEM). FIG. 1b is a magnification of a portion of FIG. 1a.

The analysis by scanning electron microscopy (SEM) was carried out using a device sold under the trade name JSM-7600F by Jeol.

FIG. 1 shows that the composite material 1 prepared from the Ketjenblack carbon black has the same structure as the base carbon black. A shininess indicates the presence of sulphur. The sulphur, after this pretreatment, is distributed homogeneously around the carbon grains and does not form agglomerates outside the latter.

Figure 2:
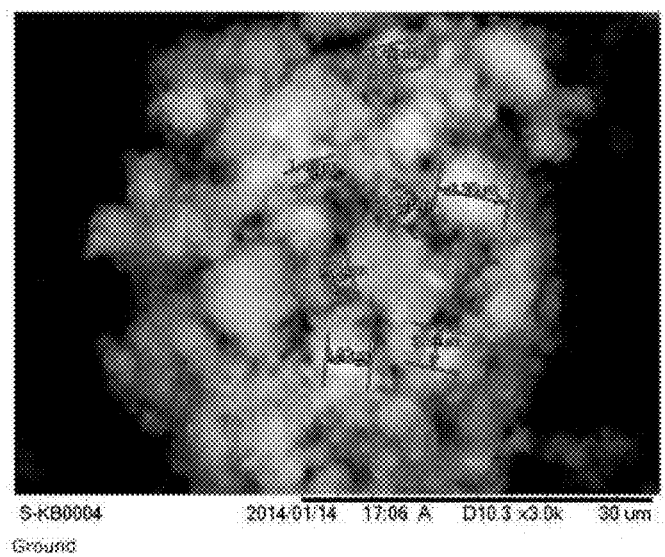
FIG. 2 is shows a mixture of Ketjenblack carbon black and elemental sulphur by SEM from example 1 in accordance with one embodiment

By way of comparison, FIG. 2 shows a mixture of Ketjenblack carbon black and elemental sulphur (proportions by weight: 18.8% of Ketjenblack carbon black and 81.2% of elemental sulphur) by SEM after the grinding stage ii) and before the heat treatment stage iii). It is observed that the sulphur does not coat the carbon grains and is not homogenously dispersed in the carbon-comprising agent.

Example 2

Preparation of a Positive Electrode E-1 in Accordance with the Invention

The composite material 1 obtained in Example 1 was mixed at 80° C. for 30 minutes with tetraethylene glycol dimethyl ether (TEGDME), polyvinyl alcohol (PVA), a lithium salt (LiTFSI) and water in a mixer sold under the trade name Plastograph® EC by Brabender®. The amount of water used represented 20% by weight approximately of the total weight of the composite material, TEGDME, PVA and lithium salt LiTFSI.

The paste thus obtained was subsequently laminated at 95° C. over a current collector made of aluminium covered with a carbon-based layer.

The film thus obtained was dried at 80° C. for 20 minutes in an oven in order to obtain a positive electrode E-1 in the form of a film in accordance with the invention.

The composition by weight of the positive electrode E-1 obtained is presented in Table 2 below:

TABLE 2

| Positive electrode | Carbon black (%) | Lithium salt (%) | TEGDME (%) | PVA (%) | S (%) |
|---|---|---|---|---|---|
| E-1 | 12.5 | 5.3 | 20.3 | 8.0 | 53.9 |

Example 3

Manufacture of a Battery B-1 in Accordance with the Invention

A battery B-1 was prepared by assembling by manual laminating at ambient temperature under an anhydrous atmosphere (air with a dew point <−40° C.):
the positive electrode E-1 obtained in Example 2,
a separator S-1 BPF220 (Bolloré) made of biaxially oriented polypropylene, and
a negative electrode comprising lithium metal in the form of a film of lithium metal with a thickness of 100 μm approximately.

The characteristics of the separator S-1: the thickness t (in μm), the porosity P (in %), the porosity of Gurley type $P_{Gurley}$ (in s/100 cm$^3$), the longitudinal thermal shrinkage measured at 100° C. for 1 hour $R_L$ (in %), the transverse thermal shrinkage measured at 100° C. for 1 hour $R_T$ (in %), the maximum puncture strength $F_{max}$ (in newtons N) and elongation at break E (in mm) are presented in Table 3 below.

The porosity of Gurley type $P_{Gurley}$ is measured using an automatic densimeter sold under the trade name Genuine Gurley Model 4340.

The porosity P is calculated by comparing the true thickness of the separator and its theoretical thickness estimated from its weight and from the density of the polypropylene.

The longitudinal $R_L$ and transverse $R_T$ heat shrinkages were estimated according to Standard ISO11501 (data obtained from the suppliers of the separators).

The maximum puncture strength $F_{max}$ and the elongation at break E were obtained using ASTM D3420 puncture tests carried out at ambient temperature using a universal testing machine sold under the trade name Adamel-Lhomargy of DY32 type.

TABLE 3

| Separator | t (μm) | P (%) | $P_{Gurley}$ (s/100 cm$^3$) | $R_L$ (%) | $R_T$ (%) | $F_{max}$ (N) | E (mm) |
|---|---|---|---|---|---|---|---|
| S-1 | 15 | >50 | 95 | 2 | 6.5 | 41 | 17 |

The positive electrode/separator S-1/negative electrode assembly was then impregnated with a liquid electrolyte consisting of a 1.5 mol/l solution of LiTFSI in TEGDME.

Figure 3:
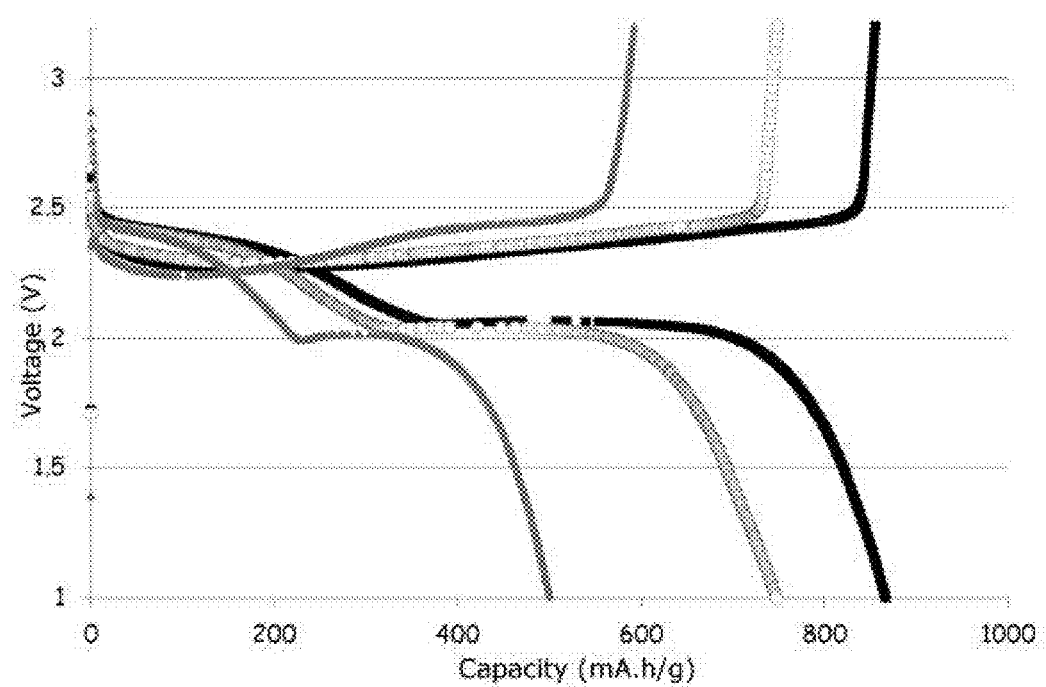
FIG. 3 is a graph of tension vs capacity of the samples of Example 3 in accordance with one embodiment

The voltage (in volts, V) of the battery B-1 as a function of its specific capacity (in mAh/g) at a current rate of (C/20, D/20) and a temperature of 40° C. is given in FIG. 3 for several cycles. In this FIG. 3, the curve with the solid black squares represents the first cycle, the curve with the hollow black circles represents the second cycle and the curve with the solid grey triangles represents the ninetieth cycle.

FIG. 3 does not show any appearance of dendrites, even after 90 cycles in the battery B-1 in accordance with the invention.

These results show that the use of a separator made of biaxially oriented polypropylene in a lithium-sulphur battery makes it possible to prevent the formation of dendrites, while retaining a high energy density by volume of greater than 120 mAh/cm$^3$ (the volume of positive electrode, of separator and of electrolyte being considered).

Comparative Example 4

Manufacture of Batteries B-A and B-B not in Accordance with the Invention

A battery B-A was prepared by assembling, by manual laminating at ambient temperature under an anhydrous atmosphere (air with a dew point <−40° C.):
the positive electrode E-1 obtained in Example 2,
a separator S-A made of non-biaxially oriented polypropylene, and
a negative electrode comprising lithium metal in the form of a film of lithium metal with a thickness of 100 μm approximately.

The characteristics of the separator S-A: the thickness t (in μm), the porosity P (in %), the porosity of Gurley type $P_{Gurley}$ (in s/100 cm$^3$), the longitudinal thermal shrinkage measured at 100° C. for 1 hour $R_L$ (in %), the transverse thermal shrinkage measured at 100° C. for 1 hour $R_T$ (in %), the maximum puncture strength $F_{max}$ (in newtons N) and the elongation at break E (in mm), are presented in Table 4 below. Unless otherwise indicated, these characteristics were obtained as described in Example 3 above.

TABLE 4

| Separator | t (μm) | P (%) | $P_{Gurley}$ (s/100 cm$^3$) | $R_L$ (%) | $R_T$ (%) | $F_{max}$ (N) | E (mm) |
|---|---|---|---|---|---|---|---|
| S-A | 25 | 55 | 180 | 5$^a$ | 0$^a$ | 63 | 30.1 |

$^a$Heat shrinkages measured at 90° C. instead of 100° C.

Figure 4:
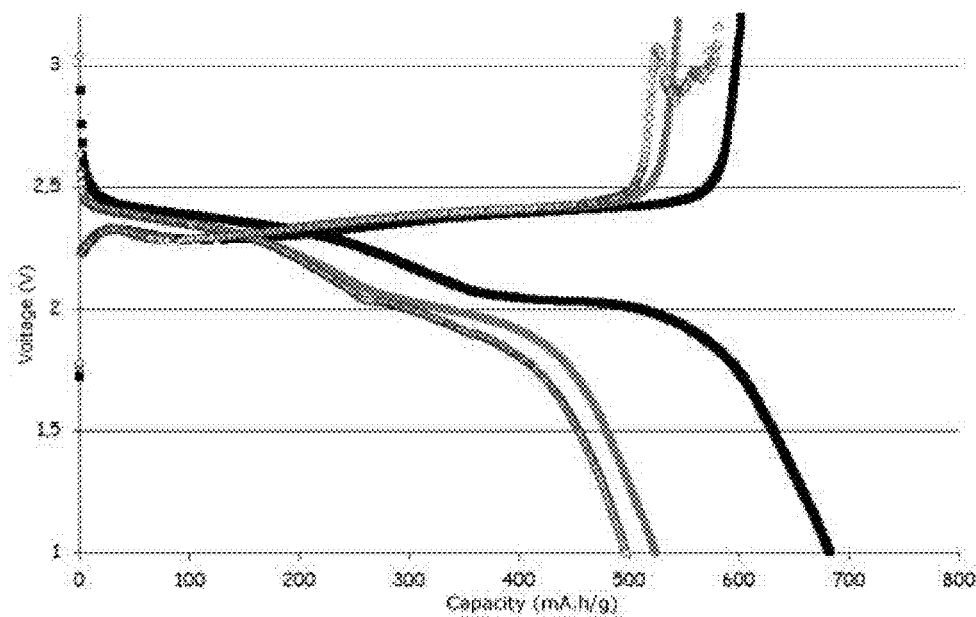
FIG. 4 is a graph of tension vs capacity of the samples of Example 4 in accordance with one embodiment

The voltage (in volts, V) of the battery B-A as a function of its specific capacity (in mAh/g) at a current rate of (C/20, D/20) and a temperature of 40° C. is given in FIG. 4 for several cycles.

In this FIG. 4, the curve with the solid black squares represents the first cycle, the curve with the solid grey circles represents the second cycle and the curve with the hollow diamonds represents the ninth cycle.

FIG. 4 shows the premature death of a battery B-A at least at the ninth cycle brought about by the formation of dendrites.

These results show that the use of a separator made of polypropylene which is not biaxially oriented in a lithium-sulphur battery does not make it possible to prevent the formation of dendrites and detrimentally affects the electrochemical performance levels of the lithium-sulphur battery.

A battery B-B was prepared by assembling, by laminating at 5 bar and at 80° C. under an anhydrous atmosphere (air with a dew point <−40° C.):

the positive electrode E-1 obtained in Example 2, a separator S-B comprising two separators S-A made of non-biaxially oriented polypropylene and placed side by side by simple juxtaposition, and a negative electrode comprising lithium metal in the form of a film of lithium metal with a thickness of 100 µm approximately.

The positive electrode/separator S-B/negative electrode assembly was then impregnated by a liquid electrolyte consisting of a 1.5 mol/l solution of LiTFSI in TEGDME.

The use of two non-biaxially oriented separators placed side by side makes it possible to prevent the premature growth of the dendrites. However, the increase in the total thickness of the separator (2×25 µm=50 µm) results in a decrease in the energy density by volume from 82 mAh/cm$^3$ (when the separator S-A is used) to approximately 50 mAh/cm$^3$ (when the separator S-B is used) (the volume of positive electrode, of separator and of electrolyte being considered).

Example 5

Manufacture of Batteries B-2, B-3 and B-4 in Accordance with the Invention

Several batteries B-2, B-3 and B-4 were respectively prepared by assembling, by manual laminating at ambient temperature under an anhydrous atmosphere (air with a dew point <−40° C.):

the positive electrode E-1 obtained in Example 2, each of the separators S-2, S-3 and S-4 made of biaxially oriented polypropylene, and a negative electrode comprising lithium metal in the form of a film of lithium metal with a thickness of 100 µm approximately.

The respective characteristics of the separators S-2, S-3 and S-4: the thickness t (in µm), the porosity P (in %), the porosity of Gurley type $P_{Gurley}$ (in s/100 cm$^3$), the longitudinal thermal shrinkage measured at 100° C. for 1 hour $R_L$ (in %), the transverse thermal shrinkage measured at 100° C. for 1 hour $R_T$ (in %), the maximum puncture strength $F_{max}$ (in newtons N) and the elongation at break E (in mm), are presented in Table 5 below. Unless otherwise indicated, these characteristics were obtained as described in Example 3 above.

TABLE 5

| Separator | t (µm) | P (%) | $P_{Gurley}$ (s/100 cm$^3$) | $R_L$ (%) | $R_T$ (%) | $F_{max}$ (N) | E (mm) |
|---|---|---|---|---|---|---|---|
| S-2 | 38 | 60 | 310 | <3 | <3 | 40 | 12.9 |
| S-3 | 35 | >60 | 77 | <3 | <3 | 40 | 13.9 |
| S-4 | 25 | >60 | 370 | <5 | <10 | 42 | 14.6 |

Each of the positive electrode/separator/negative electrode assemblies was then impregnated by a liquid electrolyte consisting of a 1.5 mol/l solution of LiTFSI in TEGDME.

Figure 5A:
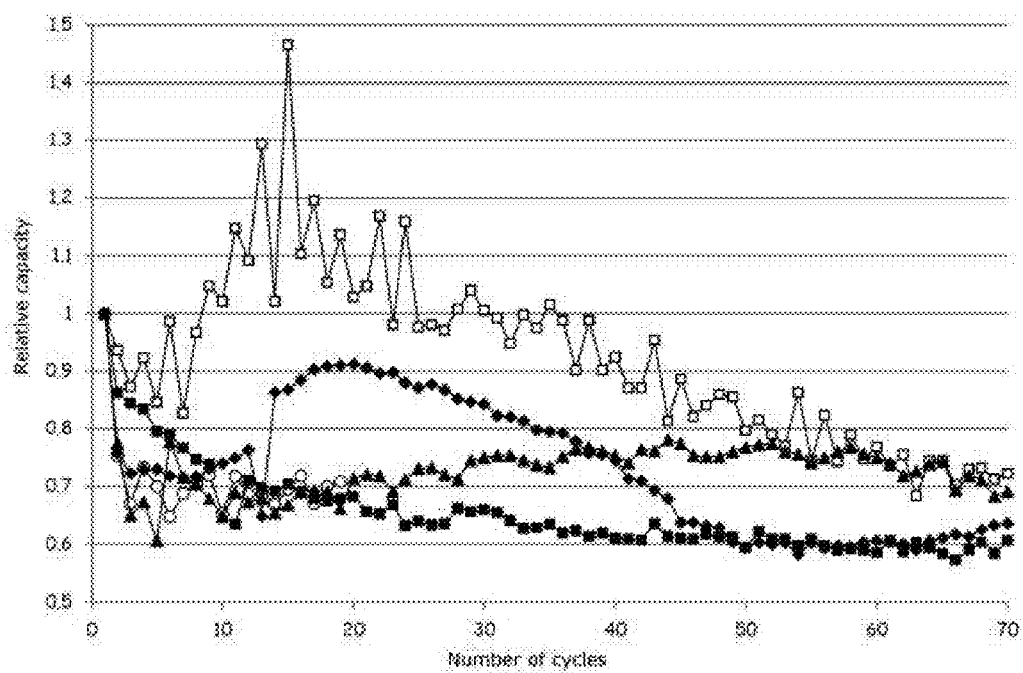
FIG. 5a is a graph of capacity vs. number of cycles of the samples of Example 5 in accordance with one embodiment

The relative capacity, corresponding to the ratio of the discharge capacity of the n cycle to the discharge capacity of the first cycle, of the batteries B-A (curved with the hollow circles), B-1 (curve with the solid squares), B-2 (curve with the solid diamonds), B-3 (curve with the hollow squares) and B-4 (curve with the solid triangles) as a function of the number of cycles at a current rate of (C/20, D/20) and a temperature of 40° C. is given in FIG. 5a.

FIG. 5a does not show any appearance of dendrites, even after 30 cycles, in the batteries in accordance with the invention B-1, B-2, B-3 and B-4, whatever the thickness of the biaxially oriented separator used. However, as observed in Comparative Example 4 above, FIG. 5a shows the premature death of the battery B-A not in accordance with the invention brought about by the formation of dendrites.

Figure 5B:
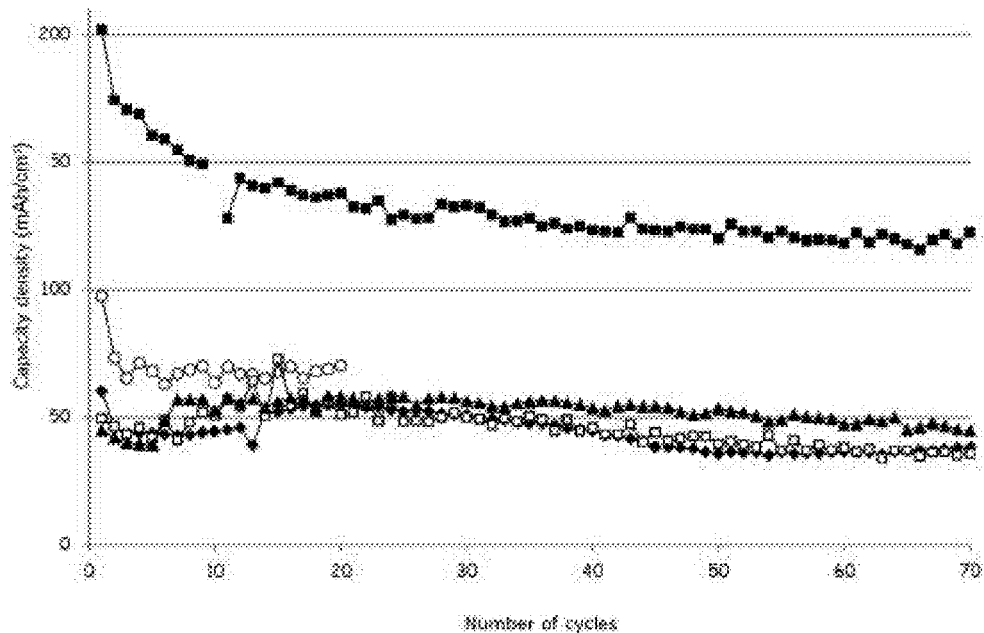
FIG. 5b is a graph of capacity vs. number of cycles of the samples of Example 5 in accordance with one embodiment

The energy density by volume (i.e. capacity density, the volume of positive electrode, of separator and of electrolyte being considered) (in mAh/cm$^3$) of the batteries B-A (curve with the hollow circles), B-1 (curve with the solid squares), B-2 (curve with the solid diamonds), B-3 (curve with the hollow squares) and B-4 (curve with the solid triangles) as a function of the number of cycles at a current rate of (C/20, D/20) and a temperature of 40° C. is given in FIG. 5b.

The results of FIG. 5b show the good cyclability of the batteries in accordance with the invention. The maximum energy density by volume (117 mAh/cm$^3$) is obtained with the separator S-1 (the volume of positive electrode, of separator and of electrolyte being considered).

Example 6

Manufacture of a Battery B-5 in Accordance with the Invention a) Preparation of a Gelled Polymer Electrolyte Lithium salt (LiTFSI) (28.2% by weight) was dissolved in TEGDME (21.8% by weight) with magnetic stirring at 50° C. A copolymer of PEO, Zeospan®, (50% by weight) was then added to the mixture obtained. The resulting mixture was kneaded in the Plastograph® EC mixer as described in Example 2 at 80° C. for 30 minutes. The electrolyte paste obtained was laminated at 95° C. between two plastic films of silicone-treated PET.

b) Assembly of the Battery in Accordance with the Invention B-5

A battery B-5 was prepared by assembling, by laminating at 5 bar and at 80° C. under an anhydrous atmosphere (air with a dew point <−40° C.):

the positive electrode E-1 obtained in Example 2, a separator S-1 BPF220 (Bolloré) made of biaxially oriented polypropylene preimpregnated with the gelled polymer electrolyte as obtained above in stage a), and a negative electrode comprising lithium metal in the form of a film of lithium metal with a thickness of 100 µm approximately.

The separator S-1 made of biaxially oriented polypropylene was preimpregnated by the gelled polymer electrolyte by colaminating the separator and the gelled polymer electrolyte at 80° C. and at a pressure of 5 bar under a dry air atmosphere (i.e., air with a dew point <−40° C.).

Figure 6:
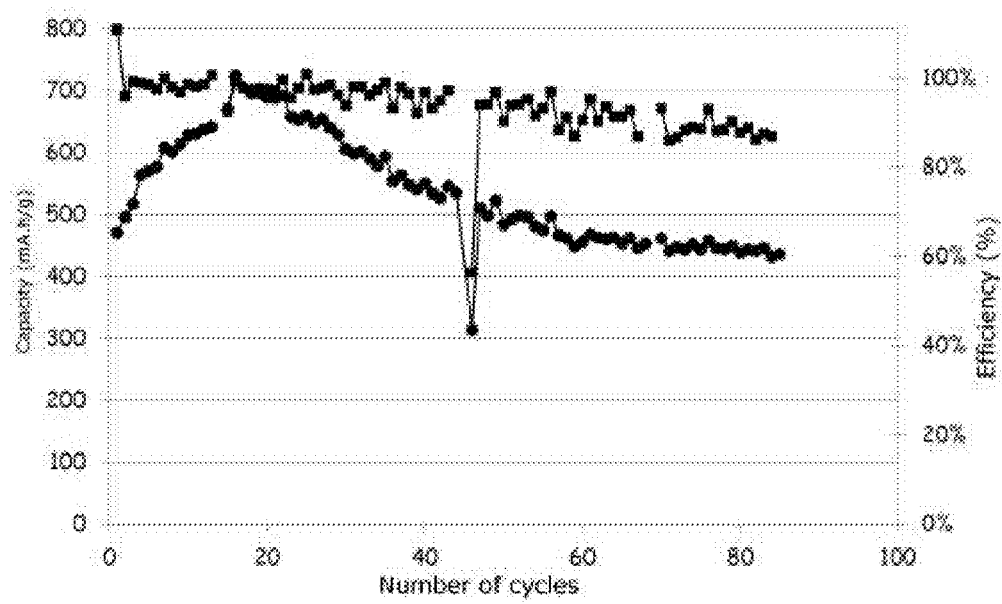
FIG. 6 is a graph of capacity vs. number of cycles of the samples of Example 6 in accordance with one embodiment

The specific capacity (in mAh/g) during the discharging as a function of the number of cycles (curve with the solid circles), and also the coulombic efficiency (in %), corresponding to the ratio of the discharge capacity of the n cycle to the charge capacity of the n cycle, as a function of the number of cycles (curve with the solid squares), of the battery B-5 at a current rate of D/20 and a temperature of 40° C. are given in FIG. 6.

FIG. 6 does not show any appearance of dendrites, even after 85 cycles, in the battery in accordance with the invention B-5.

The energy density by volume obtained is 83 mAh/cm$^3$ (the volume of positive electrode, of separator and of electrolyte being considered).

Comparative Example 7

Manufacture of a Battery B-C not in Accordance with the Invention a) Preparation of a Gelled Polymer Electrolyte Lithium salt (LiTFSI) (17.7% by weight) was dissolved in TEGDME (27.3% by weight) with magnetic stirring at 50° C. A copolymer of PEO, Zeospan®, (15% by weight) and a copolymer of vinylidene fluoride and of hexafluoropropylene (PVdF-co-HFP) (30% by weight) were then added to the mixture obtained. The resulting mixture was kneaded in the Plastograph® EC mixer as described in Example 2 at 130° C. for 30 minutes. The electrolyte paste obtained was laminated at 125° C. between two plastic films of silicone-treated PET.

b) Assembly of the Battery not in Accordance with the Invention B-C

A battery B-C was prepared by assembling, by laminating at 5 bar and at 80° C. under an anhydrous atmosphere (air with a dew point <−40° C.):
    the positive electrode E-1 obtained in Example 2,
    a gelled polymer electrolyte as obtained above in stage a), and
    a negative electrode comprising lithium metal in the form of a film of lithium metal with a thickness of 100 μm approximately.

In this example, the battery is not in accordance with the invention as it does not comprise a porous biaxially oriented separator comprising at least polypropylene. The presence of the PVdF-co-HFP in the gelled polymer electrolyte prepared in stage a) makes it possible to ensure its mechanical strength in order for it to be able to be used as separator.

Figure 7:
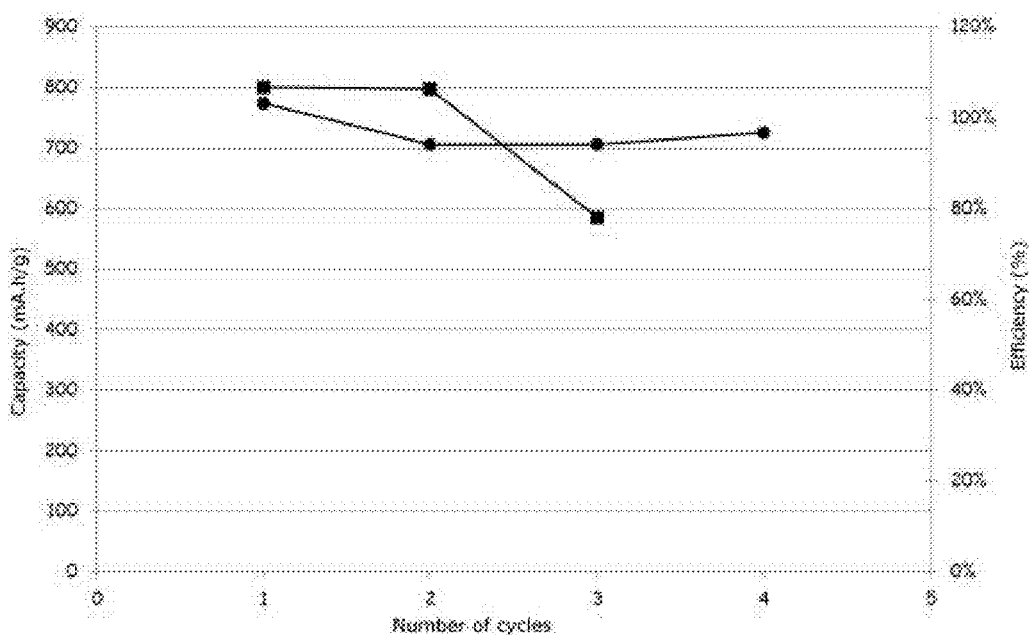
FIG. 7 is a graph of capacity vs. number of cycles of the samples of Example 7 in accordance with one embodiment

The specific capacity (in mAh/g) during discharge as a function of the number of cycles (curve with the solid circles), and also the coulombic efficiency (in %), corresponding to the ratio of the discharge capacity of the n cycle to the charge capacity of the n cycle, as a function of the number of cycles (curve with the solid squares), of the battery B-C at a current rate of D/40 and a temperature of 40° C. are given in FIG. 7.

Figure 8:
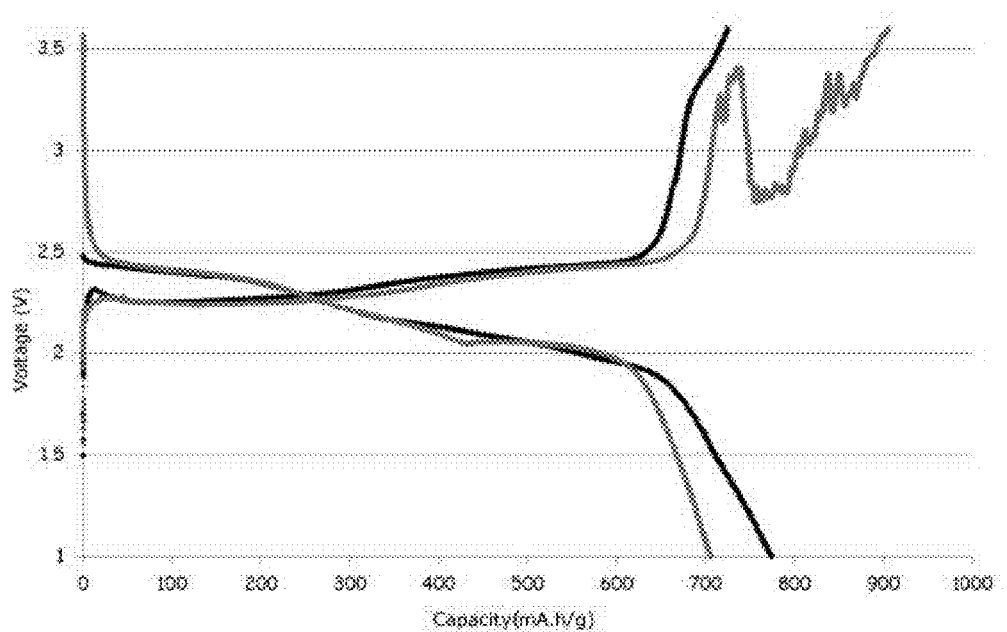
FIG. 8 is a graph of tension vs capacity of the samples of Example 7 in accordance with one embodiment.

The change in the voltage (in volts, V) of the battery B-C as a function of its specific capacity (in mAh/g) at a current rate of (C/40) and a temperature of 40° C. is given in FIG. 8 for several cycles. In this FIG. 8, the black curve represents the first cycle and the grey curve represents the third cycle.

FIG. 8 shows the appearance of dendrites from the third cycle in the battery not in accordance with the invention B-C, resulting in a detrimentally affected cyclability visible in FIG. 7. This premature dendritic growth can be attributed to the degradation of the PVdF-co-HFP of the polysulphides formed during the cycling, resulting in a deterioration in the mechanical properties of the gelled polymer electrolyte which then no longer correctly performs its antidendrite role.

The energy density by volume obtained is 95 mAh/cm$^3$ (the volume of positive electrode, of separator and of electrolyte being considered).

The invention claimed is:

1. Lithium-sulphur battery comprising:
    a negative electrode comprising lithium metal or an alloy of lithium metal,
    a positive electrode comprising at least one sulphur-comprising agent chosen from elemental sulphur $S_8$ and an organic sulphur-comprising compound having at least one S—S bond, at least one polymer binder $P_1$ and at least one agent generating an electron conductivity,
    an electrolyte comprising at least one liquid linear or cyclic polyether of low molar mass and at least one lithium salt $L_1$, and
    a porous separator,
    wherein the porous separator is a biaxially oriented separator comprising at least polypropylene and said positive electrode comprises at least 40% by weight approximately of sulphur (S) with respect to the total weight of said positive electrode.

2. Battery according to claim 1, wherein the separator exhibits a thickness ranging from 5 μm to 50 μm.

3. Battery according to claim 1, wherein the separator exhibits a porosity of greater than or equal to 50% by volume.

4. Battery claim 1, wherein the separator exhibits pores with a mean size ranging from 50 nm to 3 μm.

5. Battery claim 1, wherein the separator exhibits a porosity of Gurley type ranging from 50 to 500 s/100 cm$^3$.

6. Battery claim 1, wherein the separator exhibits a heat shrinkage in the longitudinal direction and/or a heat shrinkage in the transverse direction strictly of less than 15%.

7. Battery claim 1, wherein the polyether is chosen from:
    polyethylene glycols of formula H—[O—CH$_2$—CH$_2$]$_m$—OH in which m is between 1 and 13, glycol ethers of formula R—[O—CH$_2$—CH$_2$]$_p$—O—R in which p is between 1 and 13 and R and R', which are identical or different, are linear, branched or cyclic alkyl groups which can comprise from 1 to 20 carbon atoms,
    ethers of formula R$^1$-[CH$_2$-O]$_q$—R$^{1'}$ in which q is between 1 and 13 and R$^1$ and R$^{1'}$, which are identical or different, are linear, branched or cyclic alkyls which can comprise from 1 to 20 carbon atoms and optionally heteroatoms,
    cyclic ethers which can comprise from 2 to 20 carbon atoms or cyclic polyethers which can comprise from 3 to 40 carbon atoms, and
    one of their mixtures.

8. Battery claim 1, wherein the lithium salt $L_1$ is chosen from lithium fluorate (LiFO$_3$), lithium bis(trifluoromethanesulphonyl)imide (LiTFSI), lithium hexafluorophosphate (LiPF$_6$), lithium fluoroborate (LiBF$_4$), lithium metaborate (LiBO$_2$), lithium perchlorate (LiClO$_4$), lithium nitrate (LiNO$_3$), lithium bis(fluorosulphonyl)imide (LiFSI) and their mixtures.

9. Battery claim 1, wherein the electrolyte is a liquid electrolyte and the concentration of the lithium salt Li in the liquid electrolyte ranges from 0.8 to 8 mol/l.

10. Battery claim 1, wherein the electrolyte is a gelled polymer electrolyte and it additionally comprises at least one polymer binder $P_2$.

11. Battery according to claim 10, wherein the electrolyte comprises from 20 to 70% by weight of polymer binder $P_2$.

12. Battery according to claim 10, wherein the electrolyte comprises from 15 to 45% by weight of lithium salt $L_1$.

13. Battery according to claim 10, wherein the electrolyte comprises from 5 to 40% by weight of polyether.

14. Battery claim 1, wherein the agent generating an electron conductivity is an essentially mesoporous carbon-comprising agent exhibiting the following characteristics:
- an $S_{BET}$ specific surface of greater than or equal to 800 m$^2$/g, said specific surface being calculated by the BET method,
- a mean size of the mesopores of between 4 and 10 nm, said size being calculated by the BJH method, and
- a total pore volume of greater than or equal to 1.5 cm$^3$/g, said total pore volume being calculated by the BET method.

15. Battery according to claim 14, wherein said essentially mesoporous carbon-comprising agent is subjected, in the presence of the sulphur-comprising agent, to a pretreatment in order to form a composite material comprising sulphur (S) and carbon (C), said pretreatment comprising the following stages:
   i) a stage of mixing an essentially mesoporous carbon-comprising agent as defined in claim 14 and a sulphur-comprising agent as defined in claim 1, the amount of sulphur (S) in said mixture ranging from 75% to 85% by weight,
   ii) a stage of grinding the mixture obtained in the preceding stage i),
   iii) a stage of heat treatment of the ground mixture obtained in the preceding stage ii) in a closed container, at a temperature sufficient to cause the sulphur to melt, and
   iv) a stage of grinding the heat-treated mixture of the preceding stage iii) in order to obtain a composite material comprising sulphur (S) and carbon (C).

16. Battery according to claim 14, wherein the carbon-comprising agent is carbon black.

17. Process for the manufacture of a battery as defined in claim 1, wherein said process comprises the following stages:
   A) a stage of preparation of a liquid or gelled polymer electrolyte,
   B) a stage of assembling a positive electrode, a negative electrode and a separator,
   said process initially comprising one or other of the following stages:
   C-1) a stage of impregnation of the assembly as obtained in stage B) by the liquid electrolyte prepared in stage A), or
   C-2) a stage of impregnation of the separator by the gelled polymer electrolyte prepared in stage A), said impregnation being prior to the assembling stage B).

* * * * *

UNITED STATES PATENT AND TRADEMARK OFFICE
CERTIFICATE OF CORRECTION

PATENT NO. : 10,109,860 B2  
APPLICATION NO. : 15/322714  
DATED : October 23, 2018  
INVENTOR(S) : Margaud Lecuyer et al.

Page 1 of 1

It is certified that error appears in the above-identified patent and that said Letters Patent is hereby corrected as shown below:

In the Claims

Column 20, Claim 7, Line 47: The formula after the word "formula" is currently listed as "R-[O-CH2-CH2]p-O-R" should read "R-[O-CH2-CH2]p-O-R'"

Column 21, Claim 10, Line 1: Between the words "Battery" and "claim" the words "according to" should be present.

Column 21, Claim 14, Line 13: Between the words "Battery" and "claim" the words "according to" should be present.

Signed and Sealed this  
Eleventh Day of December, 2018

Andrei Iancu  
*Director of the United States Patent and Trademark Office*